United States Patent [19]

Suzuki

[11] 4,204,086
[45] May 20, 1980

[54] PROCESS FOR THE PRODUCTION OF HIGHLY EXPANDED POLYOLEFIN INSULATED WIRES AND CABLES

[75] Inventor: Fumio Suzuki, Yokohama, Japan

[73] Assignee: Sumitomo Electric Industries, Ltd., Osaka, Japan

[21] Appl. No.: 661,875

[22] Filed: Feb. 27, 1976

Related U.S. Application Data

[62] Division of Ser. No. 420,486, Nov. 30, 1973, abandoned.

[30] Foreign Application Priority Data

May 23, 1972 [JP] Japan .................. 47/59459
Sep. 21, 1972 [JP] Japan .................. 47/94129
Aug. 8, 1973 [JP] Japan .................. 48/88298

[51] Int. Cl.² .................. B29D 27/00; B29F 3/10; H01B 11/05
[52] U.S. Cl. .................. 174/102 R; 174/410 F; 264/45.5; 264/46.1; 264/101; 264/174; 264/DIG. 5
[58] Field of Search .................. 264/45.9, 46.1, 45.5, 264/101, 174, DIG. 5; 174/28, 102 R, 110 F

[56] References Cited

U.S. PATENT DOCUMENTS

| | | | |
|---|---|---|---|
| 2,731,069 | 1/1956 | Horn | 156/51 |
| 2,907,075 | 10/1959 | Newby | 264/45.9 X |
| 2,928,130 | 3/1960 | Gray | 264/45.9 X |
| 3,064,073 | 11/1962 | Downing et al. | 264/174 X |
| 3,222,722 | 12/1965 | Reifenhauser | 264/46.1 X |
| 3,356,790 | 12/1967 | Polizzano et al. | 156/55 |
| 3,410,932 | 11/1968 | Woodson et al. | 264/45.9 |
| 3,567,846 | 3/1971 | Brorein et al. | 174/110 F X |
| 3,693,250 | 9/1972 | Brorein et al. | 156/54 X |
| 3,764,642 | 10/1973 | Boutillier | 264/45.5 |
| 3,804,574 | 4/1974 | Gatto | 264/101 X |
| 3,814,649 | 6/1974 | Yamaoka et al. | 156/463 |
| 3,822,331 | 7/1974 | Cogliano | 264/101 X |
| 3,882,209 | 5/1975 | Yanagisawa et al. | 264/45.9 |
| 3,902,704 | 9/1975 | Ishibashi et al. | 264/45.9 |
| 3,912,800 | 10/1975 | Edlin et al. | 264/101 X |
| 3,922,328 | 11/1975 | Johnson | 264/46.1 |
| 3,927,160 | 12/1975 | Medley | 264/101 X |
| 3,936,519 | 2/1976 | Crystal | 264/45.9 X |
| 3,968,463 | 7/1976 | Boysen | 174/110 F X |
| 4,104,481 | 8/1978 | Wilkenloh et al. | 174/110 F X |
| 4,107,354 | 8/1978 | Wilkenloh et al. | 174/102 R X |

FOREIGN PATENT DOCUMENTS

| | | | |
|---|---|---|---|
| 910275 | 11/1962 | United Kingdom | 264/45.9 |
| 1233088 | 5/1972 | United Kingdom | 264/101 |
| 1434775 | 5/1976 | United Kingdom | 174/110 F |

*Primary Examiner*—Philip Anderson
*Attorney, Agent, or Firm*—Sughrue, Rothwell, Mion, Zinn and Macpeak

[57] ABSTRACT

In a process for producing a highly expanded polyolefin insulated coaxial cable comprising the steps of feeding a polyolefin, a nucleating agent and a volatile liquid as a blowing agent to an extruder and heat extruding said mixture through said extruder onto an inner conductor passing through said extruder to cover the outer periphery of said inner conductor thereby forming an insulation layer of a highly expanded polyolefin foam having a foaming ratio in excess of 2.5 times (60% expansion degree), the improvement which includes the step of, after extruding the foaming polyolefin mixture around said inner conductor, sizing the outer surface of said foaming polyolefin layer on said inner conductor by means of a sizing die to provide a highly expanded uniform polyolefin insulation layer of a predetermined size, said insulation layer being tightly adhered to said inner conductor.

22 Claims, 19 Drawing Figures

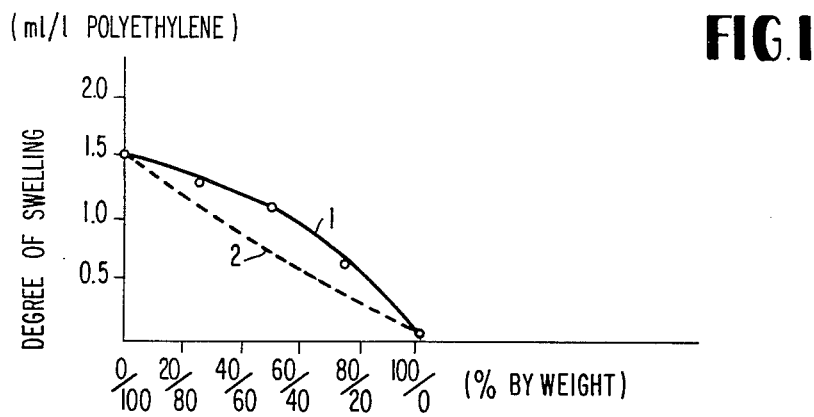
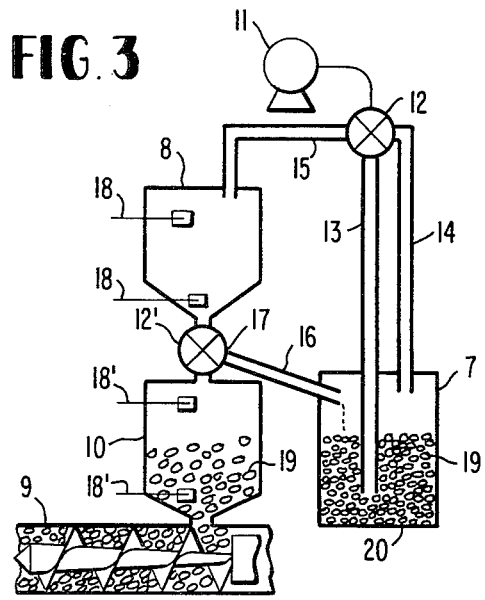
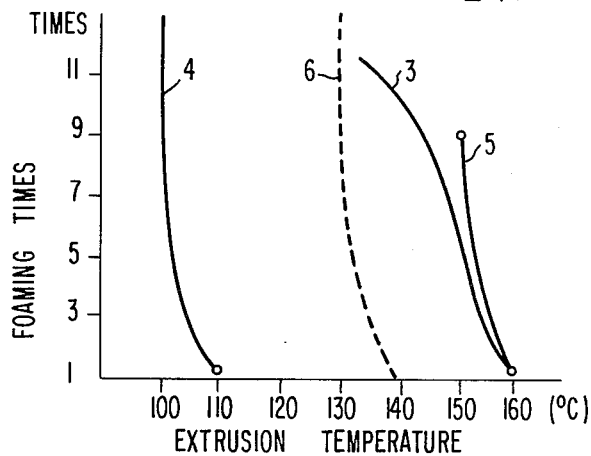
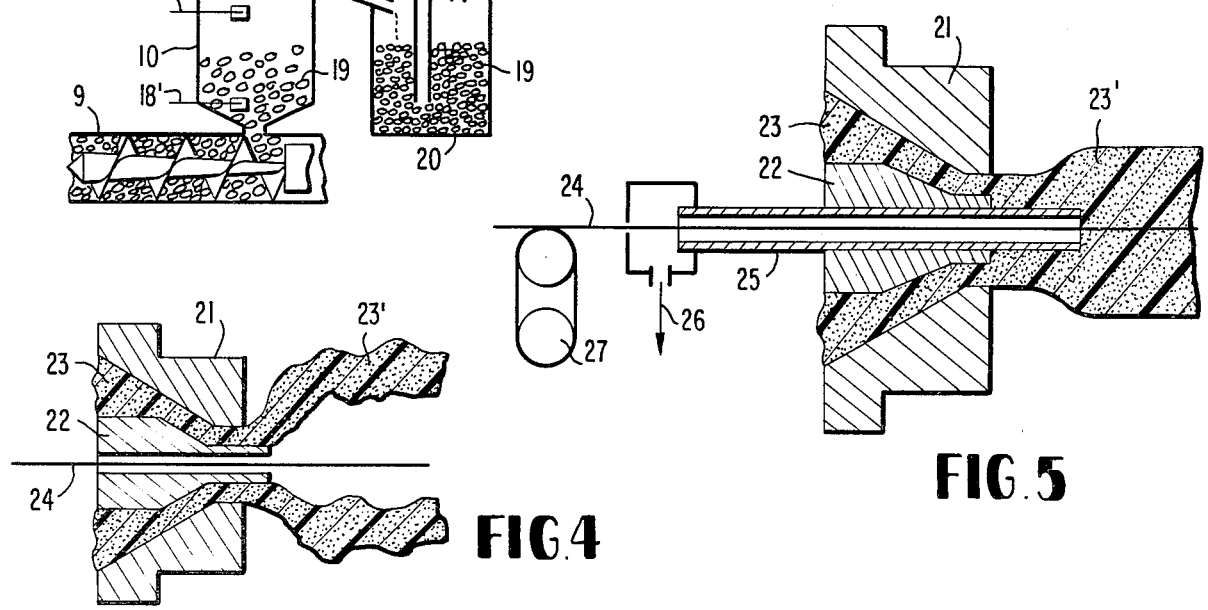

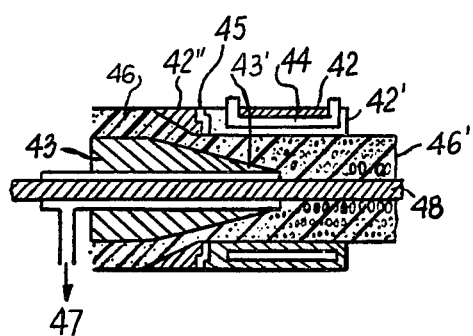
FIG.9
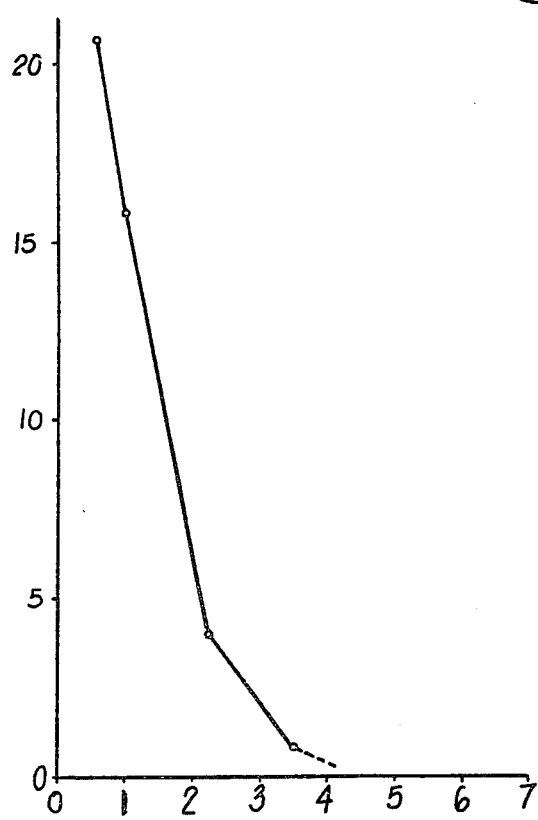
FIG.10
FIG.11

PROCESS FOR THE PRODUCTION OF HIGHLY EXPANDED POLYOLEFIN INSULATED WIRES AND CABLES

CROSS-REFERENCE TO RELATED APPLICATION

This application is a divisional application of application Ser. No. 420,486, filed on Nov. 30, 1973 and now abandoned.

1. Field of the Invention

This invention relates to a process of producing insulated wires and cables, in particular, coaxial cables having excellent high frequency characteristics, comprising the steps of extruding a mixture of a polyolefin, a nucleating agent and a volatile liquid using an extruder and tightly coating a conductor therewith.

2. Description of the Prior Art

Polyolefin foams, in particular, polyethylene foams have been used by preference as the insulation material for use with communication cables.

However, the foaming ratio in these prior art polyolefin foams is at most about two times because of the difficulty encountered in the production techniques for highly expanded foams. Therefore, for applications such as coaxial cables which require a higher foaming ratio (e.g., 3 times or more), polyolefin is partially replaced with highly expanded polystyrene which is capable of higher expansion although is less preferred from the standpoint of electrical properties.

However, since highly expanded polystyrene is by nature inferior in flexibility and has no elasticity, it has the fatal defect that it tends to break readily when repeatly flexed during production or coating as in the case of wires and cables.

Special insulation composites, such as balloon type, helical type, disk type, nob-supported type, etc., are also used but these composites are not highly expanded foams in a strict sense although they have an effect equivalent thereto. None of these types can be, however, produced efficiently as is apparent from the structure thereof, and they have the significant defect of poor water-proofing property.

Although production methods per se of various highly expanded polyolefin foams using various volatile liquids are already known, various skills are required for polyolefin foams which are obtained from conventional processes in order to apply them to insulated coaxial cables, because they are not at all suitable for practical use if used as they are. The properties of foams required for coaxial cables are different from those of foams for cushion materials, and special characteristics such as impedance, attenuation, SRL (Structural Return Loss) and the like are required. Therefore, a production technique is required which is quite different from the conventional production process for extruding highly expanded foams. Since this technique is extremely difficult, highly expanded polyolefin insulated coaxial cables have not yet been put to practical use.

After much research and development on highly expanded polyolefin insulated coaxial cables, previously considered difficult to obtain, to overcome the foregoing defects, we have succeeded in providing highly expanded polyolefin insulated coaxial cables which have sufficient properties for practical uses.

SUMMARY OF THE INVENTION

An object of this invention is to provide a process for producing highly expanded polyolefin insulated coaxial cables.

Another object of this invention is to provide a process for producing highly expanded polyethylene from a mixture of low density polyethylene and high density polyethylene using a volatile liquid.

Another object of this invention is to provide a process for providing foamed products having a uniform cell size by compounding a solid blowing agent as a nucleating agent and a decomposition accelerator each separately into a polyethylene matrix, and then blending these separate polyethylene compounds in a proper ratio on extruding.

Another object of this invention is to provide a process for molding while expanding of various crystalline plastics in which a volatile liquid has hitherto been considered unsuitable.

Another object of this invention is to provide a process for feeding a foamable compound to an extruder while preventing the volatilization of the volatile liquid contained therein.

Another object of this invention is to provide a process for molding by extrusion of expanded foams in a tubular form (hereinafter tubular foam) and simultaneously insulating conductors, for example, the inner conductor or inner conductors of a cable therewith while controlling the size of the outer diameter and the configuration of the tubular foams by controlling the foaming conditions in the tubular foams at the time of molding the foams by extrusion.

Another object of this invention is to provide a process for producing highly expanded foam insulated coaxial cables having excellent properties in which the shape of the cells in the highly expanded insulation layer is controlled during foaming so as to prevent longitudinal shrinking of the insulation layer.

A further object of this invention is to provide a process for producing highly expanded foam insulated coaxial cables in which the insulation layers of highly expanded foam are tightly adhered to the inner conductor and/or the outer conductors.

The invention provides a process for producing a highly expanded polyolefin insulated coaxial cable comprising the steps of feeding polyolefin, nucleating agent and volatile liquid to an extruder, heat extruding the compound through the extruder onto an inner conductor passing through the extruder to cover the outer periphery of the inner conductor thereby forming an insulation layer of highly expanded polyolefin foam having a foaming ratio in excess of 2.5 times (60% expansion degree) tightly adhered to said inner conductor. Embodiments of the invention also include additionally the step of the applying of a pressure reduction around the inner conductor up to an area near the contacting point of the highly expanded polyolefin foam insulation layer and the inner conductor, the step of applying an adhesive layer onto said inner conductor prior to forming the highly expanded polyolefin insulated layer onto the adhesive layer on the inner conductor, the step of feeding the compound to the extruder from a hopper and with the temperature of the compound at the exit from the hopper being higher than the temperature of the compound in the zone of the extruder near the inlet to the extruder, this temperature of the compound gradually being zonally and linearly decreased in the extruder from the exit from the hopper, the step of extruding and forming initially of a highly expanded polyolefin foam insulation layer on the inner conductor and then sizing the outer surface of the insulation layer by passing the inner conductor having thereon the foam insulation layer through a sizing die to provide a highly expanded uniform polyolefin insulation layer of a predetermined size, and the step of forming an outer conductor around the highly expanded polyolefin foam insulation layer coated on the inner conductor by welding or sinking the outer conductor.

BRIEF DESCRIPTION OF THE ACCOMPANYING DRAWINGS

In the drawings:

FIG. 1 is a graph representing the relation between the degree of swelling for actually measured values for pellets of varying composition with respect to two different types of polyolefins in accordance with this invention and the arithmetic average values calculated from each polyolefin density;

FIG. 2 is a graph representing a relation between the foaming ratio and the extrusion temperature with respect to the pellets used in accordance with this invention actually measured for each of high density polyethylene and low density polyethylene as well as that actually obtained for the blend of these polyethylenes and the expected arithmetic value of the blend of these polyethylenes;

FIG. 3 is a schematic view showing the manner in which the compound used in foaming is supplied to the extruder hopper according to one embodiment of this invention;

FIG. 4 is a schematic view showing a method of coating an inner conductor with tubular expanded foams using a conventional extruder;

FIG. 5 and FIG. 6 are views illustrating one embodiment of the method of coating an inner conductor with tubular expanded foams according to this invention showing a heating and cooling adaptor, a vacuum means, and as means for heating the conductor upon which a foamed polyolefin is coated;

Figure 6:
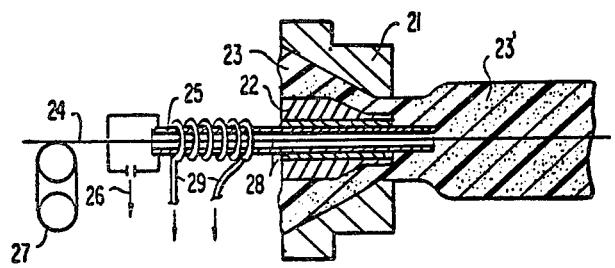
Figure 8:
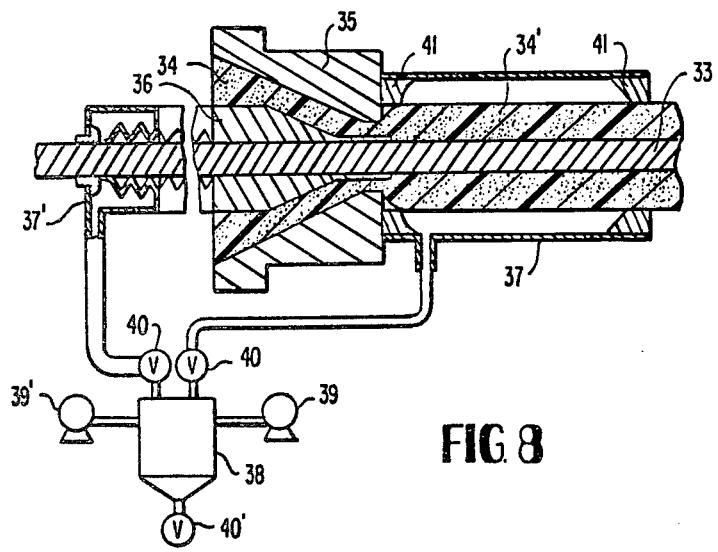
Figure 12:
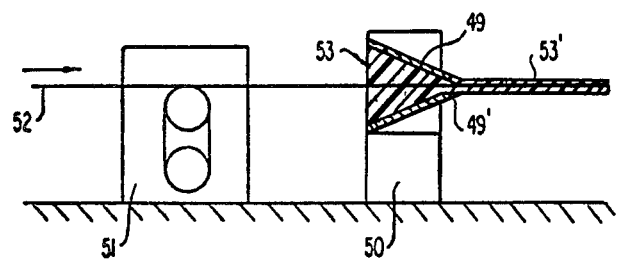
Figure 13:
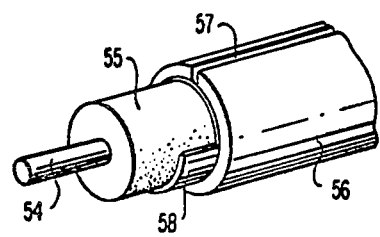
Figure 14:
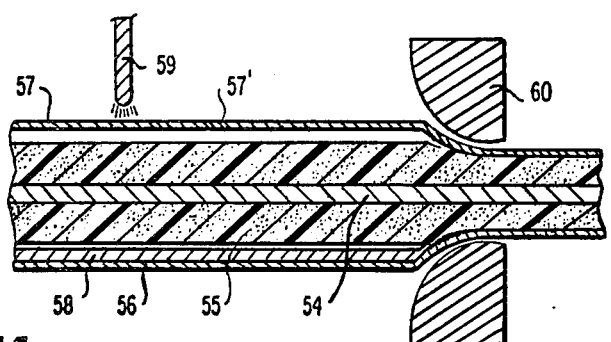
Figure 15:
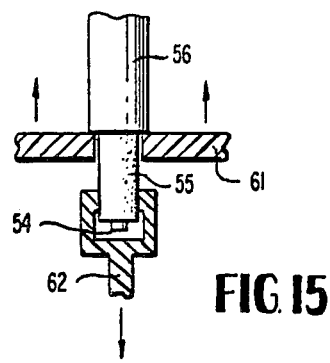

FIGS. 7(a)–(e) are cross section views of various insulated wires showing the effects of the cooling and the heating of the adapter and the heating of a conductor on foaming and adhering conditions in accordance with the embodiment of FIGS. 5 and 6;

FIG. 8 is a schematic view of one embodiment of this invention of molding expanded foams using a vacuum method in accordance with this invention;

FIG. 9 is a schematic view of another embodiment of this invention for molding expanded foams using a sizing die;

FIG. 10 is a cross section view of the wire produced by an embodiment of the process according to this invention of FIG. 9;

FIG. 11 is a graph showing the relation between the ratio of extrusion rate and the length of shrinking of the foamed insulation layer of coaxial cables wherein the ordinate represents the length of shrinking and the abcissa represents the ratio of the extrusion rate (the calculated value of the extrusion rate of the highly expanded foam insulation layer per the extrusion rate of the conductor);

FIG. 12 is a schematic view of one embodiment of this invention for applying an adhesive layer coating on a conductor;

FIG. 13 is a perspective view of a coaxial cable prior to employment of an embodiment of this invention in which a welding and sinking operation is applied to an outer conductor surrounding an inner conductor having a highly expanded foam insulation layer thereon;

FIG. 14 is a schematic cross section view illustrating the operations of welding and sinking for the coaxial cable shown in FIG. 13; and FIG. 15 is a schematic view illustrating the test for the strength of adhesion between the highly expanded foam insulation layer and the outer conductor of a coaxial cable using a tension tester.

DETAILED DESCRIPTION OF THE INVENTION

This invention provides foaming materials, methods of compounding the same, a method of extrusion and a method of improving the properties of coaxial cables in the production of highly expanded polyolefin insulated coaxial cables. For brevity the term conductor or inner conductor will be used throughout this specification to designate a conductor(s) which is(are) coated in accordance with this invention and the embodiments thereof since a major application thereof is use of such in cables.

Suitable polyolefins which can be employed herein include known high density polyethylene (e.g., polyethylene having a density $\rho$ of $0.940 \leq \rho < 0.960$ g/cm$^3$ and a melt index (MI) of about 0.1 to 2.0, preferably 0.1 to 1.0), medium density polyethylene (e.g., polyethylene having a density $\rho$ of from 0.925 to 0.940 g/cm$^3$ and a melt index (MI) of from about 0.1 to 2.0, preferably 0.1 to 1.0), low density polyethylene (e.g., polyethylene having a density $\rho$ of $0.915 \leq \rho < 0.925$ g/cm$^3$ and a melt index (MI) less than about 10 to 0.05, preferably 0.1 to 2), polypropylene and mixtures thereof, with high density polyethylene or mixtures of high density and low density polyethylenes being preferred, for example at about 80 to 20%, preferably 50 to 60%, by weight of high density polyethylene with the low density polyethylene being the balance of the composition.

Suitable blowing agents which can be employed include those having a decomposition point above 110° C. and generating heat upon decomposition, for example, azodicarboamide and p,p'-oxy bis-benzenesulfonyl hydrazide, as disclosed, for example, in U.S. Pat. No. 3,251,911. The preferred nucleating agent used herein is a solid blowing agent. When a solid blowing agent as a nucleating agent and a decomposition accelerator such as the metal salts of fatty acids, for example, zinc stearate, calcium stearate and barium stearate, as disclosed in U.S. Pat. No. 3,017,371, are used together, it is particularly desirable to compound these agents into separate portions of the polymer respectively and blend them in a predetermined ratio on using. Generally the nucleating agent and the decomposition accelerator are employed in an amount of about 0.1 to 5 phr, preferably 0.3 to 1.0 phr.

Known volatile liquids can be used herein but various liquefied gases, e.g., gases liquefied at temperatures less than 20° C. and 1 atmosphere, such as the fluorinated hydrocarbons, e.g., Freon 12, 13 and 114 or liquids having a boiling point at about ambient temperature, e.g., about 20° C., such as fluorinated hydrocarbons, e.g., Freon 11, 112 and 113, are preferred.

The volatile liquid can be compounded into polymers in known manners, e.g., the swelling process or liquid injection process as disclosed in U.S. Pat. No. 3,253,065. In the swelling process, it is advantageous to subject the polymer to a preexpansion before swelling and then swell the polymer using a volatile liquid to assist the swelling. It is also effective for the convenience of operation to swell the polymer in a volatile liquid vapor, as disclosed for example in U.S. Pat. Nos. 2,885,738 and 3,020,248.

In supplying the swelled compound to a hopper of an extruder, it is desirable to use a sealed multiple hopper, and a front end drive extruder, as disclosed in the Twenty-first International Wire and Cable Symposium pp. 173-181, is preferred as the extruder in order to retain the sealing.

The temperature at the area of the extruder closer to the hopper is preferably set higher than that of the area closer to the die of the extruder.

For tightly insulating a conductor, on which the foaming polyolefin is coated, a pressure reduction is applied around the conductor just prior to its contacting the foaming polyolefin.

The design for the nipple of the extruder die is of importance in this invention, and it is particularly desirable that the rate at which the diameter of the die is reduced be as low as possible in order to reduce the heat shrinkage in foamed body.

The extruded material does not uniformly foam when it is blowing and results in an extremely uneven product. Accordingly, it must be subjected to a sizing using various types of sizing dies.

The insulation layer thus coated onto an inner conductor is fragile for compression since it is highly expanded, and it is necessary to prevent the deformation of the expanded product as much as possible by reducing the resistance of a pay-off capstan for the inner conductor and by lining the inner side of a take-up capstan with sponge.

While conventional water cooling trough can be used in the prior process for low density polyethylene, water should be avoided strictly in the process of this invention since a highly expanded product is used, and the cooling should be effected in the atmosphere of gases such as air, carbon dioxide gas and the like.

Highly expanded foam insulated wires and cables of excellent quality can thus be obtained with this invention, but when the insulated wires and conductors are coated with an outer conductor to form co-axial cables, a phenomenon is observed that the foamed product shrinks to a great extent. In order to avoid this, it is necessary to tightly adhere the foamed product further to the outer conductor or inner conductor using an adhesive.

This invention will now be described in greater detail as to the components used therein and preferred embodiments thereof.

FOAMING COMPOUND

One object of this invention is to provide a process for producing highly expanded polyethylene from a mixture of low density polyethylene (polyethylene of a density of less than 0.925 g/cm$^3$) and high density polyethylene (polyethylene of a density of more than 0.94 g/cm$^3$) using a volatile liquid.

Japanese Patent Publication No. 3908/1972 discloses a process for producing a foamed body having highly uniform cells incorporated therein by adding a solid blowing agent and a decomposition accelerator to the compound of low density polyethylene and high density polyethylene. However, this process has the defects in that the operation can not be effected at high temperatures since the solid blowing agent sometimes decomposes on blending the mixture of polyethylene and the blowing agent, in that uniform blending is difficult to attain, and because a considerably high temperature, that is, a temperature somewhat higher than the melting point of polyethylene, is required to completely decompose the solid blowing agent in extruding the blend, which causes a reduction in the viscosity of the molten polyethylene thereby preventing the formation of highly expanded polyethylene.

Processes for extruding expanded polyethylene using low density polyethylene employing a volatile liquid are widely practiced but a process using high density polyethylene has not yet been practiced industrially at all.

The inventors have succeeded in developing a process for producing highly expanded polyethylene from a mixture of low density polyethylene and high density polyethylene, as raw materials, using a volatile liquid.

One embodiment of this invention provides a process for producing expanded polyethylene which comprises melting polyethylene having a density less than 0.925 g/cm$^3$ and polyethylene having a density more than 0.94 g/cm$^3$ compounding and then pelletizing the same, immersing the compounded pellets into a volatile liquid so as to swell the polymers, and foaming the swelled product at a relatively lower temperature, preferably, at temperatures not exceeding by 20° C. the arithmetic average of the melting points of the two types of polyethylene. The foaming is effected herein simultaneously with the extrusion molding.

The desired compounding ratio between the low density polyethylene and the high density polyethylene used in the process of this invention comprises less than 50 percent by weight of low density polyethylene and more than 50 percent by weight of high density polyethylene. Since it is extremely difficult to compound a major amount of low density polyethylene with a minor amount of high density polyethylene uniformly, since the resulting product molded therefrom does not have a smooth surface, and since the physical properties of the products are substantially the same as those of the low density polyethylene alone, there is no significant advantages in compounding with high density polyethylene where the low density polyethylene is used in relatively large amounts.

In the process according to this invention, the two types of polyethylene in the above-described compounding ratio are thoroughly compounded at temperatures above the melting point of the high density polyethylene in a roll mixer, Banbary mixer, etc. and then formed into pellets. Then, the pellets are immersed in a volatile liquid such as a halogenated hydrocarbon, for example, methylene chloride, fluorinated hydrocarbons and an aliphatic hydrocarbons, for example, pentane, hexane, heptane, etc. and then swelled to yield the foamable compound.

The degree of swelling of the pellets is observed to exceed the arithmetic average of the individual degrees of swelling of each type of polyethylene, since the degree of swelling of the low density polyethylene is much higher than that of the high density polyethylene and, therefore, the volatile liquid can more easily permeate into the center of the pellets to increase the degree of swelling when the low density polyethylene is uniformly compounded with the high density polyethylene. The above analysis is also confirmed by examining the changes in the degree of swelling relative to the passage of time wherein the time required for the maximum degree of swelling for the low density polyethylene alone is substantially the same as that of the mixture of the low density polyethylene and the high density polyethylene. In contrast a much longer time is necessary with high density polyethylene alone.

The relationship in the degree of swelling is shown in FIG. 1, wherein 1 is a curve showing saturation degrees of swelling in which high density polyethylene is immersed in Freon 11 (trichloromonofluoromethane) as a volatile liquid as normal temperature e.g., 20° to 30° C., and 2 is the curve showing the saturation degrees of swelling obtained from the arithmetic average of those with each density of polyethylene.

In producing foamed products from the foamable compound thus obtained, the compound can be foamed simultaneously with the molding in a conventional extruder and the like. Highly expanded products can be obtained in this process at a relatively lower extrusion temperature but it is usually preferred to employ temperatures not exceeding by 20° C. the arithmetic average of the melting point of each of the polyethylenes. Since higher extrusion temperatures are desired for the extrusion processability and lower temperatures are desired for the foaming properties, there is an optimum temperature in the extruding step of this process and this optimum temperature is in a somewhat lower range in this process as described above.

In the present process, it has been experimentally confirmed that the foaming ratio can easily be controlled by adjusting the extruding temperatures since the foaming ratio changes slowly relative to changes in the extrusion temperature, although the theoretical reason for this is not at present known.

The relationship between the extrusion temperature and the foaming ratio is shown in FIG. 2, wherein 3 is an experimentally determined curve obtained from the foaming compound produced by swelling the pellets, which are prepared by compounding the two types of polyethylene in an equivalent amount, using Freon 11, to a degree of swelling of 18 wt.% (polyethylene). 4 is an experimentally determined curve obtained from the foaming compound produced by swelling pellets consisting of low density polyethylene alone and 5 is an experimentally determined curve obtained from the foaming compound produced by swelling the pellets consisting of high density polyethylene alone in a similar manner. Curve 6 represents the arithmetic average of above 4 and 5 when the two polyethylenes are used in an equivalent amount. As is apparent from FIG. 2, since the slope of the curve 3 is less lower than that of 4, 5 or 6, control of the foaming ratio is easier, and products with a higher foaming ratio can be obtained at a lower temperature with the blend of low and high density polyethylenes.

Although the advantageous effects in blending polyethylenes of different densities have been described with the swelling method using a volatile liquid for the sake of convenience, it can readily be understood that the advantage of easy control of the foaming ratio can also be attained using a liquid injection method. It will further be understood easily by those skilled in the art that the blending of polymers having different melting points or melting viscosities instead of blending polyethylenes of different densities is advantageous in the control of the foaming ratio.

The use of a solid blowing agent as a nucleating agent will next be described. It is known that solid blowing agents are effective for controlling the cell size but it is necessary that the solid blowing agent decompose at a relatively low temperature since the extrusion temperature is low in the present process so long as a volatile liquid is used.

Incorporation of a decomposition accelerator to accelerate the decomposition of the blowing agent is known but it is difficult to compound them uniformly and the blowing agent is decomposed in the compounding step in the mixer.

The present invention, therefore, in one embodiment provides a process for providing foamed products having a uniform cell size by compounding each of the blowing agent and the accelerator separately into a polyethylene matrix and blending these separately compounded polyethylenes in an appropriate ratio in extruding.

When, for example, azodicarbonamide is used as a solid blowing agent and zinc stearate is used as a decomposition accelerator, the azodicarbonamide is compounded with the low density polyethylene having a lower melting point and the zinc stearate is compounded with the high density polyethylene having a higher melting point.

It is also effective to incorporate the solid blowing agent into the polyethylene having the higher melt flow index and generating less heat in melt compounding and decomposition accelerator to polyethylene having lower melt flow index and generating more heat. The use of the blended polymer results, as stated above, in the advantage of easier control of the foaming ratio as compared with the use of only a single type of polymer.

It is, of course, possible to compound the solid blowing agent into a portion of a polymer and decomposition accelerator to another portion of the same polymer when a blend polymer is not used.

When the blended polymer is used and an accelerator is not used, the solid blowing agent can be compounded only with lower density and/or lower melt flow index polymer.

METHOD OF SWELLING

Referring now to more specific details of the volatile liquid, the volatile liquid used herein is not per se novel, is known and includes volatile liquids such as the fluorinated hydrocarbons. A feature of this invention resides in the process of compounding the volatile liquid into the polymer, particularly in the swelling process.

A foaming compound produced by swelling polystyrene beads with a volatile liquid is conventionally used in various industrial applications. Although there are no difficulties in using them for expansion molding under high pressure such as compression molding using molds, the cell size developed in the molded products becomes too large when they are used for expansion molding such as extrusion molding under relatively low pressures. Thus, the incorporation of finely divided organic or inorganic particles as nucleating agents is required to avoid such defect.

However, since both the foaming compound and the nucleating agent are solid, it is difficult to mix them uniformly in the polymer and the volatile liquid impregnated in the polystyrene beads partially volatilizes in the mixing operation. Moreover, the swelling of polystyrene with the volatile liquid requires a longer time, and care must be taken in selecting the volatile liquid which is compatible with the polystyrene beads.

Another embodiment of this invention, therefore, provides a process capable of overcoming the foregoing disadvantages thoroughly and which is applicable also to a process for expansion molding of various crystalline plastics such as polyethylene and polypropylene for which the use of a volatile liquid has hitherto been considered unsuitable.

The present invention comprises molding while expanding in the usual manner the foaming compound which is obtained by compounding a solid blowing agent and, if desired, a decomposition accelerator with a polyolefin and foaming and pelletizing the same at temperatures lower than the decomposition point of the solid blowing agent and then swelling the pellets with a volatile liquid.

The solid blowing agents which can be compounded with the polyolefin include the conventionally used organic or inorganic blowing agents such as azodicarbonamide, p,p'-oxybisbenzene-sulfonylhydrazide, sodium bicarbonate, etc., and those having a nucleating effect at the expansion stage are particularly preferred.

If desired, a decomposition accelerator, such as a metal soap, urea and the like can be added to and compounded with the polyolefin and the solid blowing agent and then this compound expanded and pelletized at a temperature above the decomposition point of the solid blowing agent. The foaming ratio of the pelletized products can appropriately be controlled by varying the expansion temperature and pelletizing temperature used. Since a decomposition accelerator is used for the foaming of the pellets so that they foam smoothly, it can be selected depending on the combination of the plastic material and the solid blowing agent.

The foaming pellets thus prepared are immersed in volatile liquids such as aliphatic hydrocarbons, for example, pentane, hexane, etc. and halogenated hydrocarbons, for example, methylene chloride and Freon, etc. to swell the cells in the pellets with the volatile liquid. The volatile liquid used herein can be selected in accordance with the types of plastic materials employed and depending on the latent heat of volatilization, the critical temperature, gas permeability, etc. The degree of swelling by the volatile liquid is determined of itself by setting the expansion and pelletizing temperature of the foaming pellets depending on the desired foaming ratio of the final products because the degree of the swelling of the volatile liquid is due to the foaming ratio of the foaming pellets.

The foaming compound thus obtained is subjected to foaming in the extrusion process, when the solid blowing agent remaining in the foaming compound provides a nucleating effect to render the cell size uniform.

In the process of this invention, as described above, the plastic materials are swelled extremely easily by the volatile liquid since they are in the form of foamed pellets, and excellent results are obtained in using the process in the production of crystalline plastics (polyolefin) as well, with which the use of the volatile liquid has hitherto been considered unsuitable.

Moreover, the degree of swelling of the volatile liquid can easily be controlled by adjusting the foaming ratio of the pellets. In addition, the swelling time can be shortened as compared with the conventional volatile liquid method, and the foaming ratio of the extruded products can be increased.

Further, since the foaming pellets entrap the volatile liquid in the cells thereof while swelling, the volatile liquid is not easily volatilized and the products can be stored for a long time without difficulties thereby stabilizing the foaming ratio in the extrusion process.

This swelling method is also effective for other applications such as in the polymer blending described in the nucleating agent compounding method.

In blending the polyethylene of lower melt flow index with the polyethylene of higher melt flow index, for example, two types of volatile liquids which swell the polyethylene to different extents are used, the higher melt flow index polyethylene being compounded with the volatile liquid swelling polyethylene to a lower degree and lower melt flow index polyethylene being compounded with the volatile liquid swelling polyethylene to a higher degree. Each are swelled respectively and then the two are compounded in a desired ratio, and fed to an extruder. Then, the difference in the melt viscosities is reduced as compared with those before the swelling to thereby facilitate uniform compounding and, therefore, the production of uniformly foamed products.

This concept is also applicable to the blending of polyethylenes having different densities, wherein the volatile liquid swelling polyethylene to a greater extent is used for the higher density polyethylene and the volatile liquid swelling polyethylene to a lower extent is used for the lower density polyethylene.

The polymer need not always be immersed completely into the volatile liquid in the swelling and sufficient swelling can be attained even in the vapor of the volatile liquid.

In this swelling process, it is not always necessary for the volatile liquid to swell all of the materials. For example, a compound which contains ingredients which may be eluted by the volatile liquid can be used by incorporating this compound, which has not been swelled, into another compound which has beenn swelled.

In using polymers having different densities and viscosities together, it is only necessary to swell the higher density or the higher viscosity polymer to provide satisfactory results.

METHOD OF EXTRUSION

Referring to the extrusion method, a process for supplying the foaming compound to the extruder using the volatile liquid swelling method will be initially explained.

This embodiment of this invention provides a process for feeding the foaming compound to an extruder while preventing the volatilization of the volatile liquid.

Recent foaming agents for polyethylene and polystyrene, etc. include highly volatile liquids such as halogenated hydrocarbons, for example, methylene chloride, Freon, etc. and aliphatic hydrocarbons, for example, pentane, hexane, etc. Particularly, with respect to polystyrene, pellets (beads) swollen using such highly volatile liquid are commercially available as a foaming compound.

However, these foaming compounds have the disadvantages that the volatile liquid included in the pellets partially volatilizes on storage or in the hopper, thereby resulting in a variation in the degree of swelling of the individual pellets (beads) and resulting in a nonuniform foaming condition in the molded foam products or reducing the foaming efficiency.

This embodiment overcomes these disadvantages and provides a process for supplying the foaming compound to the extruder while preventing the volatilization of the volatile liquid by providing a closed system between the swelling step of the pellets (beads) and the supplying step of the swollen pellets to the extruder by advantageously utilizing the vapor pressure of the volatile liquid.

This embodiment of the present invention provides a process for supplying the foaming compound to the extruder and an apparatus therefor with the embodiment comprising swelling the pellets (or beads) with the volatile liquid in a swelling tank, introducing the thus swelled foaming compound together with the volatile liquid into one or more storage (also drying) tank or tanks, thereafter, separating the volatile liquid therefrom, then circulating a gas such as air or nitrogen containing the volatile liquid vapor in the storage (drying) tank or tanks onto the surface of the swelled polymer to remove the volatile liquid adhered on the surface of the foaming compound, and then filling the storage (drying) tank or tanks with the saturated vapor of the volatile liquid, and thereafter, supplying the foaming compound to a previously pressurized hopper of the extruder in a closed system extending from the point at which the pellets (beads) are swelled to the point at which the swollen pellets (beads) are supplied to the extruder.

This embodiment will be more clearly understood from the descriptions in detail referring to the accompanying drawings.

In FIG. 3 showing an embodiment of this invention, a swelling tank 7, a storage (drying) tank 8, extruder 9, a hopper 10 of the extruder, a motor 11, turn-over valves 12, 12', pipes 13, 14, 15 and 16, filter 17 provided in the pipe 16 adjacent a turn-over valve 12', level switches 18, 18', swelled pellets (foaming compound) 19 and volatile liquid 20.

The pellets (foaming compound) 19 swelled by the volatile liquid 20 in the swelling tank 7 are introduced together with the volatile liquid into the storage (drying) tank 8 through the pipes 13 and 15 by means of the motor 11. The volatile liquid 20 is separated using the filter 17 and returned to the swelling tank 7 through the pipe 16. When the storage (drying) tank 8 is filled completely with the foaming compound 19, the level switch 18 is actuated to switch the turn-over valve 12 thereby closing the passage in the pipe 13.

Then, the saturated vapor of the volatile liquid 20 filled in the swelling tank 7 is circulated through pipes 14, 15 and 16 using the motor 11 into the storage (drying) tank 8 to remove the volatile liquid 20 adhered to the surface of the foaming compound 19 and, thereafter, the turn-over valve 12' is switched to close the passage in the pipe 16 thereby filling the storage (drying) tank 8 with the saturated vapor of the volatile liquid 20. When the foaming compound is not used immediately, the turn-over valve 12 is switched to close the passages in the pipes 13 and 14 and the inner pressure of the storage (drying) tank 8 is kept above the vapor pressure, preferably, above the critical pressure of the volatile liquid at the temperature in the tank 8. The foaming compound can thus be stored for a long time with no changes in the degree of swelling thereof due to aging. Large quantities of the foaming compound can be stored by providing two or more storage (drying) tanks 8 connected to each other.

In using, the stored foaming compound 19 is supplied to the extruder by switching the turn-over valve 12' to open the passage for the hopper 10 and introducing the foaming compound into the hopper 10, previously pressurized with the saturated vapor of the volatile liquid. The pressure applied to the hopper 10 serves to prevent volatilization of the volatile liquid 20 incorporated in the foaming compound 19 due to the effect of the heat generated in extruding, and it can be higher than the vapor pressure, preferably the critical pressure of the volatile liquid at the melting temperature of the foaming compound 19.

In order to avoid any changes in pressure on introducing the foaming compound 19 from the storage (drying) tank 8 into the hopper 10, it is desirable to equalize the pressure in the storage (drying) tank 8 to that in the hopper 10 directly before the introduction of the foaming compound 19. Such changes in pressure can be prevented by connecting a pressure pump to the storage (drying) tank 8 and the hopper 10.

When the hopper 10 is filled with the foaming compound 19, the level switch 18' is actuated to turn over the valves 12 and 12' and, thereafter, the same operations as described above are repeated.

According to this embodiment, as above described, the system from the preparing step of the foaming compound to the supplying step for the extruder is completely closed and, in addition, the foaming compound is always kept in the volatile liquid or under the saturated vapor thereof. Accordingly, no changes on aging occur at all in the degrees of swelling of the individual pellets (beads), and the degassing in the extrusion step caused by the operation of the extruder can be prevented thereby enabling the production of uniformly expanded products with excellent foaming efficiency and stability. Moreover, this embodiment of the invention can be applied also to the production of the highly expanded products and provide excellent products easily that have hitherto required difficult operations.

In the process of this invention, sufficient effects can not be achieved if the hopper portion is closed where the screw axis portion is incompletely sealed. In order to avoid this and keep the system closed completely, it is advantageous to use a conventional front-end drive type extruder.

Referring now to the method of setting the temperature for the extruder, the temperature condition is very important in the extrusion of highly expanded foams and, particularly, a non-uniform temperature directly causes non-uniform foaming.

One of the features of this invention is to set the temperature of the extrusion cylinder toward the hopper higher than the temperature of the cylinder at the extruding side. The polymer is thus melted at the hopper side of the extruder primarily by the heat from the cylinder and this prevents localized over heating caused by the shear of the screw, keeps the resin temperature constant and avoids the degassing of the volatile liquid. Since the polymer is melted early at the side of the hopper, the passage for the gas generated through the degassing of the volatile liquid is inhibited from communicating to the hopper and almost all of the volatile liquid can be utilized effectively. It is particularly surprising that highly expanded foams can be obtained by setting the temperature higher at the hopper side in supplying the compound swelled by the volatile liquid to the hopper.

ADHESION OF FOAMS AND CONDUCTORS

The foregoings describe the embodiment for extruding highly expanded foams using a volatile liquid. The importance in using highly expanded foams for the insulation of wires and cables lies in considering how to coat the inner conductors tightly with this foam as an insulation. If they should be extruded without providing a particular extruding means, the coated products cannot be used as wires and cables because of a considerable unevenness in both the inner and outer diameters, and because the foam does not adhere tightly to the inner conductors at all since they are highly expanded.

The process for tightly adhering the highly expanded foam onto the inner conductors to provide useful highly expanded foam insulated wires and cables according to this invention will be described hereinafter.

The vacuum method for improving the tight adherence between the highly expanded foam and the inner conductors will be described initially explained.

If a foaming compound is formed in a tubular shape, the general tendency is the formation of cells in various directions and, particularly, in the direction along which the inner and outer diameter of the tube increase. This tends to provide a non-uniform outer diameter and an unstable configuration, and the tendency becomes more significant as the foaming ratio increases. Accordingly, although the production of wires and cables using molding by extrusion of a tubular foamed body and a simultaneous coating of the same onto inner conductors has been hitherto practiced with the lower expanded foam, highly expanded foam insulated wires and cables have not yet been produced because of the difficulty of tightly adhering the expanded foams to the inner conductors.

This embodiment of the invention provides a process for molding by extruding an expanded foam in a tubular shape and simultaneously insulating the inner conductors therewith while regulating the size of the outer diameter and the configuration of the tubular foams by controlling the foaming conditions of the tubular foam at the time of molding the foam by extrusion.

This embodiment of the present invention provides a process for extruding tubular foamed products and insulating inner conductors therewith in which an extruder provided with an adapter connected to a vacuum pump at the inside of a nipple is used, and the inner conductors, previously heated if desired, are supplied through thus adapter and insulated with an extruded tubular foam. In the process the inner pressure of the tubular foam is reduced to adjust the foaming conditions therein using this adapter. Further in the process an extrusion head having a nipple in which the adapter, provided with cooling or heating means, is used and the inner pressure of the tubular foam is reduced simultaneously with a cooling or heating to adjust the foaming ratio in coating the inner conductors by extrusion as above.

The advantages thus obtained from this embodiment of this invention can be summarized as follows:

(1) Since the inner pressure of the tubular foams is reduced using a vacuum pump to aid the foaming (in the direction toward the conductor) and the inner conductors are preheated if desired:

(a) the contact areas are increased to improve and tightly adhere the foam in the melting, (b) the condition of foaming in the tubular foams can freely be controlled by adjusting the pressure reduction by the vacuum pump, and (c) the depth of the interior layer (i.e., the material which is solid closest to the conductor) of the tubular foams can appropriately be varied by adjusting the heating temperature in the inner conductors.

(2) Since the inner pressure of the tubular foams is reduced using the vacuum pump to facilitate the foaming (inwardly) and the inside thereof is simultaneously cooled or heated by the cooling and heating adapter:

(d) the foaming ratio can be controlled more precisely and over a wider range by alternatively adjusting the degree of pressure reduction by the vacuum pump and the temperature of the adapter, (e) by heating the adapter, the foamed products can be tightly adhered in melting to the inner conductors without preheating, and (f) in using the foaming compound to be molded at a higher temperature, the decrease in the adhering power caused by the rapid cooling can be prevented by heating the adapter.

This embodiment of this invention is to be described with reference to the accompanying drawings, particularly to FIG. 4, which illustrates the conventional process for molding a tubular expanded product having foaming ratio of more than 3 and simultaneously insulating the inner conductors therewith using a conventional extruder, wherein die 21, nipple 22 for supporting and carrying the inner conductor, molding compound 23 capable of foaming, molded foam 23', and the inner conductor 24 are shown. The foaming compound 23' effected the foaming in the direction that increases the inner diameter and the size and the configuration of the inner diameter of the foamed polyethylene are uneven to inhibit tight adherence to the inner conductors 24.

FIGS. 5 and 6 illustrate this embodiment of the invention for extruding tubular foams having foaming ratio more than 3 and simultaneously insulating the inner conductors therewith by using an extruder. The extruder shown includes the addition of an adapter and an inner conductor heating means of this invention to the conventional extruder as shown in FIG. 4. In FIG. 5, an adapter 25 is provided inside a nipple 22 for supporting and carrying the inner conductor 24. This adapter 25 is connected to a vacuum pump 26, and a heating means 27 for the inner conductor is provided just before the point at which an inner conductor 24 is introduced to the adapter 25. In FIG. 6, an adapter 25 of a heat conductor such as a metal is heat insulated using a heat insulation material 28 such as fluoro resin at the inside of a nipple 22 for supporting and carrying the inner conductor shown in FIG. 5 and the adapter is provided with a cooling or heating means 29 such as pipes, etc. and the adapter is connected to a vacuum pump 26.

The process of this invention is carried out by extruding and molding the tubular foams 23' simultaneously reducing the pressure inside thereof to a predetermined level using vacuum pump 26 and supplying therein inner conductor 24 which is heated, if desired, using heating means 27 through the adapter 25, or by cooling or heating the inside of the foams 23' to a predetermined temperature and supplying therein the inner conductor 24 which is heated if desired. It is desired to adequately select the degree of pressure reduction, generally a pressure reduction of about 5 mmHg to about 200 mmHg, preferably less than 140 mmHg in the vacuum pump, and the temperatures of the adapter and conductor, depending on the end use applications intended and the types of foaming compound used. It is also preferred to set the cooling temperature necessary for the cooling of the adapter below that of the foaming point of the foaming compound and the heating temperature necessary for heating the adapter in the vicinity of the melting point of the foaming compound.

Figure 7A:
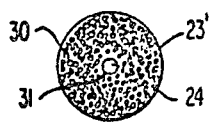
Figure 7B:
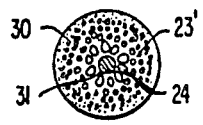

FIGS. 7a and 7b are cross sections of tubular foam insulated wires and cables illustrating the effects of this embodiment of the invention in which the effects of the degree of pressure reduction, cooling and heating of the adapter, and the heating of the inner conductor on the foaming conditions and on the close adhesion to the inner conductors (as set forth in detail in the table below), wherein gas cell 30, solid layer 31 and void 32 are shown.

| Reference Figure | Pressure Reduction | Heating of Inner Conductor | Adapter | Foaming & Tight Adhesion to the Inner Conductor |
|---|---|---|---|---|
| 7(a) | reduced | heated | cooled | uniform foaming over the entire surface and tightly adhered in melting only at the surface of the conductor |
| 7(b) | reduced | heated | not operated | foams are larger on the inner side and closely adhered in melting only at the surface of the conductor |
| 7(c) | reduced | heated (higher than in 7a & 7b) | not operated | foams are larger on the inner side and the melted portions extend and adhere tightly |
| 7(c') | reduced | not heated | heated | foams are larger on the inner side and the melted portions extend and adhere tightly but the portions are a little less than in c above |
| 7(d) | reduced | not heated | cooled | uniform foaming over the entire surface but no tight adhesion in melting |
| 7(e) | not reduced | not heated | not used | non-uniform foaming over the entire surface, configuration is unstable and no adhesion to the inner conductor |

| | |
|---|---|
| Foaming Compound | high density polyethylene (d = 0.95 g/cm$^3$ and MI = 0.3) Freon 11 13 phr by weight |
| Heating Temperature of Inner Conductor | a: 120; b: 120; c: 250° C.; |
| Degree of Pressure Reduction | a: 4mmHg; b: 4mmHg; c: 4mmHg; d: 4mmHg; |
| Cooling Temperature for Adapter | a: 60; d: 60° C.; |
| Heating Temperature for Adapter | C': 135° C. |

According to this embodiment of the invention, insulated wire and cables having preferred electric properties can be obtained by increasing the degree of the pressure reduction in the adapter and stopping the cooling of the same to increase the foaming ratio inside the adapter and simultaneously increasing the heating temperature for the inner conductor to increase the depth of the non-forming layer thereby tightly adhering the foams to the inner conductor, or by heating the adapter approximately to the melting point of the foaming compound and increasing the degree of the pressure reduction thereby eliminating the preheating of the inner conductor.

As is apparent from the foregoing, the tight adhesion of the highly expanded foams to inner conductors can be attained by employing a suitable process such as applying a vacuum from the side of the inner conductors and the like. However, the foams produced do not always have a smooth outer surface but, on the contrary, the surface is considerably uneven, and they are not suitable for use as wire and cables in this condition. This embodiment of this invention of a method of controlling the size of the surface thereof will, therefore, be described referring at first to the vacuum method.

This embodiment provides a pressure adjusting adapter for recovering the excess volatile liquid which volatilizes in the vicinity of the exit of the foaming compound from the extruder and controlling the foaming ratio and the outer diameter thereof in the extruder for the foam.

Recently, halogenated hydrocarbons such as methylene chloride, Freons, etc., and aliphatic hydrocarbons such as pentane, hexane, etc. have been used as volatile liquids for polyethylene, polystyrene, and the like. However, since halogenated hydrocarbons are expensive and toxic, and aliphatic hydrocarbons are inflammable and explosive, such conventional volatile liquids should be recovered when they volatilize in the vicinity of the exit for the foaming compound.

According to this embodiment, to achieve the above purpose, the excess volatile liquid volatilizing in the vicinity of the exit for the foaming compound can be recovered by providing in a conventional extruder an adapter connected to a vacuum pump and to a pressure pump and a device for adjusting the foaming ratio and the outer diameter of the foams is provided.

More specifically, a pressure adjusting adapter for use with the foam extruder is provided according to this invention. This comprises providing an adapter at the exit for the foaming product and/or on the extruder head, connecting a liquefying (storage) tank to the adapter, and connecting a vacuum pump alone or in combination with a pressure pump to the adapter by way of the liquefying (storing) tank.

This embodiment will now be described in detail with reference to, but not restricted to, an extruder for coaxial cables consisting of tubular foams and inner conductors insulated therewith.

FIG. 8 is a view illustrating the structure and operation of an extruder for the highly expanded foam insulated coaxial cables according to this invention, wherein inner conductor 33, foaming compound 34 for insulating the inner conductor and containing the volatile liquid therein and tubular foams 34' molded and coated on the inner conductor are shown. 35 is a die, 36 indicates a nipple for supporting and passing the conductor 33 therethrough, 37 and 37' are adapters mounted near the exit of the tubular foams 34' and in the extruder head, 38 is a liquefying (tank) connected to adapters 37, 37', 39, 39' are vacuum pumps connected by way of the liquefying tank 38 to the adapters 37, 37', 40 is a valve and 41 is a sealing die which is provided on the inside of both ends of the adapter 37 and can also serve as the sizing die for the foams.

The apparatus according to this invention collects the volatile liquid which volatilizes on the outer and the inner surfaces of the tubular foams under vacuum evacuation by way of the vacuum pumps 39, 39', and introduces the same into the liquefying (storage) tank 38 for liquefication and storage therein. The foaming ratio and the outer diameter of the foams is controlled by the effect of the sizing die 41 for the foam and by the suction controlling effect of the vacuum pumps 39, 39'. If the vacuum pump 39 is replaced with a pressure pump, the inner pressure of the adapter 37 is increased by the blowing agent in the gaseous or liquid state, and the foaming ratio on the outer side of foams is suppressed. While, the inner pressure of the adapter 37' is reduced by vacuum pump 39' to facilitate the foaming inside of the foam thereby improving the close adhesion power of the foams to the inner conductors.

Further, cooling and heating devices can be provided on the adapters 37, 37' in order to enhance the ability to adjust the foaming ratio and the outer diameter. These cooling and heating devices are also effective for the recovery of the volatilizing liquid.

As described above, the apparatus of this invention, provides excellent advantages in view of material economy and the safety of operation since the expensive volatile liquid which is highly toxic, inflammable and explosive can be ecovered and reused. This also increases the working efficiency and the value of the products since the foaming ratio and outer diameter of the foamed products can be adjusted easily and close adhesion of the foams to the inner conductors can be improved.

Another embodiment for the surface sizing process of this invention is described below.

This embodiment provides a process for producing tubular foams having a uniform outer diameter.

Various sizing processes in producing tubular foams using an extruder for controlling the outer diameter of the final products are known, such as the Selka process (*Modern Plastics* Jan. 1969, p 106–107) and the processes disclosed in Japanese Patent Publication Nos. 7556/1969 and 32318/1969. However, these processes use a sizing die and only the outer diameter of the tubular foams can be controlled. Therefore, the inner diameter thereof remains uneven and the foaming condition of the entire foams can not be controlled appropriately. Moreover, the processes described in the two patent publications immediately above are not applicable to the production of highly expanded polyolefin insulated coaxial cables, since the diameter of the sizing die is gradually increased in these processes, which tends to result in cells in the outer portion and to increase the inner diameter thereby causing unevenness.

The inventors have also developed an embodiment of this invention for sizing the inner diameter by controlling the foaming ratio through a cooling and a pressure reduction inside of the tubular foams in extruding and coating the tubular foams.

This embodiment provides the capability of more easily controlling the inner diameter and also the outer diameter of the tubular foams. The present invention provides a process for insulating the inner conductor with the tubular foams using a mold extruder for tubular foams which comprises foaming and extruding the foaming compound by passing the same between a die having a parallel land of a same diameter as the outer diameter of the tubular foams and a nipple having a tapered portion in the parallel land of the die, and appropriately cooling the outer periphery of the tubular foams, if desired.

The above process according to the invention will be described referring to the accompanying drawings, in particular, to FIG. 9 showing an embodiment of this invention for insulating the inner conductors, wherein 42 indicates a die having a parallel land 42' of substantially the same diameter as the outer diameter of the tubular foams and a tapered portion 42'', 43 is a nipple having a tapered portion 43' in the parallel land 42' and 44 is a cooling device incorporated in the parallel land 42'. Inner conductor 48, heat insulation material 45, foaming compound 46, foamed product 46', and the vacuum apparatus 47 are also shown.

It is desirable that the parallel land 42' of the die 42 be as long as possible, and the angle of the tapered portion 43' of the nipple 43 is preferably selected appropriately depending on the foaming rate of the foaming compound so that the angle is decreased as the foaming rate is reduced. The angle of the tapered portion 42'' of the die 42 is also selected appropriately relative to that of the tapered portion 43' of the nipple 43. The changes in the pressure in the die at the time of foaming (compression—opening) is produced by varying the cross section of the passage for the resin just before and after the foaming initiation point. Whether the pressure changes are rapid or slow is determined by the foaming rate. If the relationship between them is not appropriately controlled, various inconveniences result such as cells of a non-uniform diameter and a non-uniform configuration in the final products.

The outer diameter of the foaming compound 46' is controlled as the outer periphery thereof is gradually cooled in the parallel land 42' of the die 42 in molding, where the parallel land 42' can be cooled while adjusting the cooling temperature depending on the properties of each foaming compound used and the properties of the tubular foams desired.

FIG. 10 shows a cross section of the insulated coaxial cables obtained by applying the process of the present invention, in which the cells increase gradually in the tubular foam 46' toward the inner conductor 48 to adhere to the conductor tightly under compression, and the outer diameter of the foamed product is uniform and stable. When the outer surface is rapidly cooled to form a solid layer, it is most suited as a protecting insulation of the foams.

Since a die having an elongated parallel land of substantially the same diameter as the outer diameter of the tubular foams and capable of being cooled, if desired, in the process of this invention is used, the tubular foams are extruded after the foaming in the outer periphery of the foaming compound has been thoroughly completed and, therefore, free foaming which is disadvantageous, does not occur again outside of the extruder and the outer diameter of the tubular foam can easily be controlled.

In addition, the use of a nipple having a tapered portion in the area of the parallel land of the die causes foaming along the tapered portion of the nipple to be gradual and this keeps the inner diameter always in a uniform shape (circular). Moreover, by the vacuum attraction of the tip of the nipple, the inner diameter can be controlled and adhered closely to the inner conductors.

When this process is applied to a foaming compound incorporating volatile liquid therein, the molding proceeds more smoothly and better results are obtainable because the volatile liquid serves also as a lubricant.

Although there are other known processes for shaping the surface which use various other types of dies, all of these processes have the defect that the foamed product is difficult to pull back toward the conductor because of the resistance exerted by the sizing dies. Therefore, the foam should be pulled back by the vacuum method while tightly and closely adhered to the inner conductor. As will be described in detail hereinafter, the method is also extremely effective in which adhesives are used between the inner conductor and the foam. It will readily be understood that the molding can further be effected easily by the combination of the use of the vacuum method and adhesives.

Expanded foams having a uniform outer diameter can thus be extruded onto the surface of the inner conductor to insulate the conductor as described above. However, attention should be paid to factors which degrade the properties of the expanded foams. One of them is the water absorption caused by cooling and the other is the deformation (collapse) of the expanded foams by a take-up capstan.

Referring now to the cooling, it can be performed usually by filling a cooling trough with water as used in the conventional expansion of foams of a lower degree of expansion. For highly expanded foams, however, since the continuous foaming tends to occur and the significant heat shrinkage of the foams occurs at the time of cooling, water deeply permeates into the foams to hinder easy drying. This severely degrades the electrical properties thereof as coaxial cables and, therefore, water cooling is strictly avoided thus necessitating gas cooling with inert gases such as air and the like. If the air is insufficient for cooling, dry ice, etc. must be used to assist the cooling. A significant advantage can sometimes be obtained, particularly from the standpoint of production, by using an atmosphere having a higher gas permeability to the polymer than the volatile liquid. It is further preferred to use such gases in a heated atmosphere, because this results also in the annealing of the expanded foams without producing a great degree of shrinkage thereby providing wires and cables having electrical properties showing less changes at the time of use.

The take-up capstan used herein should be of the caterpillar type and constructed, for example, so as to be pressed by a belt lined with sponge in order to prevent deformation of the expanded foams. The provision of the supply capstan for the inner conductor just before the extruder head is advantageous to reduce back-tension and decrease the pressure of the take-up capstan. The driving power source for the supply and takeup capstans, extruding screw and the like can be provided in common so as to prevent abrupt changes in individual power thereby avoiding abnormal tensions in them and a deformation of the foams, and the desired coaxial cables having stable properties can thus be produced.

In producing a coaxial cable by covering the outer periphery of the highly expanded polyolefin insulated cables and wires thus obtained with an outer conductor such as aluminum and the like, there is a serious problem that the expanded foams shrinks significantly when they are subjected to heat cycling comprising heating and cooling.

It is essential for a coaxial cable that the properties thereof do not change at all even over a long period of time of use, and any shrinking of the foam on the insulation etc. must be avoided by all means since such changes apparently cause a degradation in the properties. The method of preventing such shrinking is described below, at first, using a method in which the diameter of the extrusion die is decreased as much as possible.

This embodiment of the invention provides a process for producing highly expanded foam insulated coaxial cables in which longitudinal shrinking of the highly expanded foam insulation layer is prevented.

In a highly expanded foam insulated coaxial cable, the insulation layer generally tends to shrink in the longitudinal direction when subjected to heat cycling, and this tendency becomes even greater as the foaming ratio of the insulation layer increases. Particularly, in cables of a structure in which the outer periphery is confined by metals such as in a coaxial cable having an outer conductor, remarkable shrinking occurs therein causing various difficulties on long time use such as a peeling of the insulation layer from the conductor, etc. A method of adhering the highly expanded insulation layer to the conductor is employed to prevent such difficulties but with the defects that buckling can sometimes occur if the diameter of the inner conductor is small in the adhesion between the inner conductor and the insulation layer because the highly expanded insulation layer shrinks to a great extent. The inner conductor may shift resulting in a break in the adhesion between the outer conductor and the insulation layer. Further, a contact with the inner conductor can be caused when a soft outer conductor is used such as metallic shield wire. In addition to the foregoing defects, adhesives having better adhesion properties also have higher dielectric constants and dielectric losses thereby degrading the electrical properties. Moreover, the method necessarily involves the additional adhesive application step in the production of cables and also a removal step thereof on use, which extremely reduces the efficiency of the operation.

This invention overcomes the foregoing defects and provides a process for producing highly expanded foam insulated coaxial cables of excellent property having none of the above defects in which the shape of foaming cells in the highly expanded insulation layer is controlled so as to prevent longitudinal shrinking of the insulation layer.

The inventors have discovered that when the foaming cells in the highly expanded foam insulation layer of the wire and cables take the form of an ellipse having its major axis aligned in the direction of the radius of the wires and cables, the cells shrink in the direction of this major axis by which the surface area thereof is reduced at the time of the cooling and, therefore, the foamed insulation layer shrinks radially and not longitudinally, and that insulated wires and cables with higher compression strength can be obtained by controlling the outer diameter of the insulation layer using sizing die and the like, so the radial shrinkage of the wire and cables can be prevented. The inventors further discovered that the high expanded foam insulation layer having such a cell shape can be produced by setting the extrusion velocity of the highly expanded foam insulation layer (the velocity at the exit of the die before the foaming, that is, the velocity just after contact of the foaming material with the inner conductor) higher than the velocity of the inner conductor. Since the foaming compound is compressed in the direction of extrusion, the foaming in this direction (longitudinal direction) is suppressed and the foaming in a radial direction is facilitated and thus the cells are produced in the shape of an ellipse having its major axis aligned in the direction of the radius of the inner conductor.

In this invention, the relationship between the extrusion velocity ratio of the highly expanded insulation layer versus that of the inner conductor (referred to simply as extrusion velocity ratio hereinafter) and the length of shrinking of the highly expanded insulation layer is hyperbolic. Then, this extrusion velocity ratio can appropriately be selected based on this relationship in accordance with the end-use applications of the cables, the number of heat cycles, the type of foaming compounds and the like.

FIG. 11, plotted on the basis of the data obtained from the examples described below, shows the hyperbolic relationship which exists wherein the ordinate represents the length of shrinking and the abscissa represents the extrusion velocity ratio (calculated value of the extrusion velocity of the highly expanded foam insulated coaxial cables of the inner conductor). As is apparent from FIG. 11, the shrinking approaches zero as the extrusion velocity ratio increases and a practical upper limit of this ratio is preferably up to 1:3 because of the roughing of the surface of the expanded foams, cellular disturbance, and pressure increase of extruder head, etc.

Cells of a desired shape can be obtained in this invention also by varying the diameter of the die. As the diameter of the die decreases, the flow rate of the foaming compound becomes higher than that of the inner conductor, and this produces a longitudinal compressional stress and radial stretching stress thereby resulting in elliptically shaped cells whose major axis is aligned in the direction of the radius. Changes in the flow rate of the foaming compound in this case do not affect the size of the outer diameter of the highly expanded foam insulation layer and expanded foams of the same uniform diameter can be obtained.

The same effect of this invention can also be attained by varying the extrusion amount or the feed velocity of the inner conductors.

This embodiment of the invention is applicable to the production of coaxial cables to provide highly expanded foam insulated wires and cables with extremely high quality.

The advantages provided according to this embodiment of the invention are summarized below.

(1) Since the highly expanded insulation layer per se does not shrink, this layer need not be adhered to the conductors using adhesives.

(2) The absence of the adhesives prevents a degradation of the electrical properties of the wires and cables and provides excellent operational efficiencies both in production and on use.

(3) Since the insulation layer does not shrink, this invention can effectively be applied not only to wires and cables with inner conductors of a large diameter but also to thin or soft inner conductors.

(4) Since the foaming occurs in the radial direction, highly expanded foam insulated wires and cables can be provided having high compression strength.

For further and complete prevention of shrinking, tight adhesion of the inner or outer conductors and the highly expanded foam insulation layers is advantageous.

The adhesion of the highly expanded insulation layer to the inner conductors will be next described.

This embodiment of the invention provides a process for extremely easily producing highly expanded foam insulated coaxial cables having a highly expanded foam insulation layer and the inner conductor tightly adhered to each other and possessing preferred electrical properties.

It is generally known to provide an adhesive layer onto an inner conductor for closely adhering the insulation layer to the inner conductor in highly expanded foam insulated wires and cables. Since the polarity of the adhesives and thus the dielectric constant and dielectric losses thereof increases as the adhesivity increases, the adhesive layer should be as thin as possible. However, it is difficult to provide an extremely thin adhesive layer using conventional methods such as the extrusion method, the solution coating method, the fluidizing bed method and the like, since each of the methods have the following defects. In the extrusion method, the formation of a thin film is difficult since the film formed tends to be discontinuous, the depth of the film is not uniform due to the difficulty in aligning the centers of the die and the nipple, and the residual stress is high because a non-uniform film is stretched per se. In solution coating, several application steps are required to obtain a uniform thick of film because the solution is highly diluted and has a low viscosity, and the solvent used therein inhibits a thorough preheating of the inner conductors and creates undesirable safety and health problems. The fluidizing bed method results in a film having many pin holes since a powder is coated in this method; and the film has an uneven surface and a poor film strength since coating is effected only by dissolving the powder.

This embodiment of the invention provides a process for producing highly expanded foam insulated coaxial cables having a tightly adhered insulation layer and an inner conductor and excellent electrical properties in a conventional extruder which comprises: applying an extremely thin adhesive film (abbreviated hereinafter as thin film) onto the inner conductor using an extremely simple facility and operation without using an extruder while advantageously applying the "self-centering" ability of a "floating die" which is one of the concepts for providing a uniform plastic coating on an inner conductor; and providing a further coating of a highly expanded foam insulation layer by extrusion thereon.

This embodiment of this invention comprises keeping in a squeeze die the material which is melted by heating above the heat flowing temperature, passing the inner conductor therethrough, coating a thin film thereon using the drag stress of the inner conductor due to the film adherence and then providing on this thin film a coating of highly expanded foam insulation compound by extrusion.

In the conventional process, the floating die is mounted on the extruder in a floating manner and freely moves in accordance with the changes in the extrusion to effect self-centering. On the contrary in the present process, the self-centering can be attained by dragging the inner conductor without floating the die particularly. On dragging the inner conductor, the passing point of the inner conductor can freely be shifted in accordance with the changes in the heat flow condition of the thin film material in the die to thereby effect the self-centering. In addition, in the present process, the thin film material in the die is dragged out by the drag stress of the inner conductor causing an inherent stirring and compounding in the die, and the provision of the squeeze die applies a shear stress at the exit of the die to provide strength to the thin film.

FIG. 12 illustrates an embodiment of the process of this invention for providing a coating of a thin film material on the inner conductor, wherein a squeeze die 49, die exit 49', a heating device 50 for the die 49, a preheater 51 for the inner conductor 52, thin film material 53 and the coated thin film 53' on the inner conductor 52. The inner conductor 52, preheated in the preheater 51, is introduced into the squeeze die 49 in which the heat flowing thin film 53 is kept, uniformly coated with the thin material 53' using the drag stress of the inner conductor 52, and the thin film 52' thus coated is provided with strength due to the shear stress exerted thereon at the exit 49' of the die 49. The thickness of the thin film is determined depending on the electrical property of the material used and generally a film thickness of less than 0.3 mm is preferred. The thin film material used herein includes homopolymers and copolymers of ethylene, vinyl type polymers or other series which have a heat sealing property with respect to the highly expanded foam insulation layer, and they are preferably supplied in a particulate form in view of the ease of melting. To provide a heat flow-ability to material in such a form, they can be heated to a temperature above the melting point of the thin film but below the decomposition point thereof. To improve the tight adhesion between the thin film and the inner conductor, higher temperatures are preferred for the preheating of the inner conductor and for the thin film material, and on the contrary, lower temperatures are desirable for a uniform coating of the thin film. Therefore, the heating temperature can be selected appropriately depending on the particular end-use application intended. The angle of the squeeze die can appropriately be selected depending on the characteristics required such as the strength of the thin film, etc.

The relationship between the angle of the inside of the die and the characteristics required for the thin film is set forth in the table below.

| Die Inside Angle | Thin Film Strength | Smoothness on Film Surface | De-gassing Effect on Film Formation | Retained Stress in Thin Film (shrinkage) |
|---|---|---|---|---|
| large | high | high | great | great |
| small | low | low | small | small |

The inner conductor thus coated with the thin film is introduced into the extruder and coated with the highly expanded foam insulated material.

Since the coating of the adhesive layer can be effected simultaneously with the coating of the highly expanded foam insulation layer by extrusion according to this invention using the facility as shown in the drawings, the cost of the equipment is reduced and the operation is greatly simplified. Moreover, since the adhesive layer can be provided in an extremely thin and uniform thickness, lowering of the electrical properties advantageously can be avoided. In addition, since the inner conductor is not buckled if the highly expanded foam insulation layer shrinks, this process provides even more significant effects when applied to coaxial cables comprising an inner conductor having a relatively large diameter and a highly expanded foam insulation layer.

The invention will now be described with respect to another embodiment in which the outer conductor is adhered to the highly expanded foam insulation layer.

This embodiment of the invention provides a process for producing highly expanded foam insulated coaxial cables in which the insulation layers of the highly expanded foam and the outer conductors are tightly adhered.

It is known to adhere tightly the inner conductor and the insulation layer using adhesives in a highly expanded foam insulated coaxial cable comprising a highly expanded foam insulation layer and the outer conductor sequentially on the inner conductor, and the tight adhesion of the outer conductor to the insulation layer using adhesives is also known.

This embodiment provides a method of tightly adhering the outer conductor consisting of a metal having a smooth surface to the highly expanded foam insulation layer using a nonpolar polymeric adhesive material, etc. on the basis of the development of a production process for a highly expanded foam insulated coaxial cable which advantageously utilizes the step of sinking in the production of the coaxial cable.

This embodiment of the invention provides a process for producing a highly expanded foam insulated coaxial cable in which a highly expanded foam insulation layer and an outer conductor are sequentially provided on the inner conductor by providing an adhesive layer between the highly expanded foam insulation layer and the outer conductor and, thereafter, providing the outer conductor cover and sinking the same.

FIGS. 13 and 14 illustrate an example of coating and sinking the outer conductor, wherein a tape-like outer conductor 56 is molded onto the highly expanded foam insulation layer 55 using a sizing roller into circular body having diameter slightly larger than that of the layer 55 coated onto the inner conductor 54. The butted portion 57 of the tape-like outer conductor 55 is welded by a welding machine 59 and this assembly is subjected to a sinking by passing through the sinking die 60 and the highly expanded foam insulation layer and the outer conductor are adheered to each other tightly.

It has been found and utilized in this invention that the cells contained in the outer portion of the highly expanded foam insulation layer 55 are collapsed in this sinking and any unevenness in the surface of the insulation layer is smoothed. According to this invention, the collapsed portions are filled with adhesives thereby enabling tight adhesion between the highly expanded foamed insulation layer 55, which is difficult to adhere, and the outer conductor having a smooth surface.

The outer conductor used in this process can include plain tape or tubular aluminum, copper metal and a composite of cooper and adhesive plastics.

The adhesives which can be used herein include various types such as solution types, two-component types, tape types, heating setting types, heat fusing types, and the like. As shown in the drawing, the adhesive layer 58 of such an adhesive is provided between a highly expanded foam insulation layer 55 and an outer conductor 56, for example, by applying a coating of the adhesive on the inner surface of the outer conductor 56 opposite the butted portion 57 at the time of coating the highly expanded foam insulation layer 55 with the outer conductor 56 in the form of a plain tape while forming the tape into a circular cross-section. The adhesive layer 58 thus provided covers the entire surface to tightly adhere the insulation layer 55 and the outer conductor 56 in the sinking. In using two-component type adhesives, each component is applied separately and mixed to react at the time of the sinking. In the case of the heat setting type and the heat fusing type, of adhesive the adhesives are cured by the heat produced in the sinking and, if desired, with additional external heating to tightly adhere the insulation layer and the outer conductor. Moreover, the adhesives are embedded in the cells collapsed in the sinking or in the recesses in the surface of the insulation layer to increase the adhesion strength together by an anchoring effect.

The process of this invention provides more advantageous effects in comparison with the conventional process in which the inner conductor is adhered to the insulation layer, and an excellent coaxial cable can be obtained by employing a composite (tape) as an outer conductor and adhering the same also to the protection layer thereon. It can easily be understood that the process of this invention is also applicable with more advantageous effects to the production of a corrugated type coaxial cable in which the surface of the outer conductors are corrugated.

This invention will now be further described by reference to the following non-limiting examples thereof. Unless otherwise indicated, all parts and percents, etc. are by weight.

EXAMPLE 1

50% by weight of low density polyethylene having a density of 0.92 g/cm$^3$ and a melt index of 1.0 and 50% by weight of high density polyethylene having a density of 0.95 g/cm$^3$ and melt index of 0.3 were uniformly compounded in a roll mixer at a temperature of 160° C. and then pelletized. The pellets were immersed in Freon 11 (monofluoro trichloromethane) at 20° C. and swelled to a degree of swelling of 18% (by weight).

The swelled pellets were extruded using an extruder of with an inner diameter of 38 mm size at an extrusion temperature of 130° C. to form an expanded foam body having a foaming ratio of 12.

The relationship between the extrusion temperature and the foaming ratio was examined and it was found that, as shown by curve 3 of FIG. 2 that the foaming ratio can be controlled more easily as compared with the curves 4 and 5 in which low density polyethylene and high density polyethylene were respectively used alone.

EXAMPLE 2

The high density polyethylene used in Example 1 was formulated with 1 part by weight of azodicarbonamide (this formulation hereafter referred to as A) and with 1 part by weight of zinc stearate (similarly referred to as B), respectively, and blended uniformly in a mixer at a temperature of 160° C. and then pelletized.

The Formuations A and B were blended in a ratio of 1:1 and then extruded after the swelling in the same manner as described in Example 1 except that the extrusion temperature was set at 145° C. to produce a finely and uniformly expanded foam body.

For comparison, 0.5 parts by weight of each of azodicarbonamide and zinc stearate were formulated with the high density polyethylene to form Formulation C and compounded in a roll mill at a temperature of 160° C. Then, the azodicarbonamide was almost decomposed and the yellowish color characteristic to azodicarbonamide completely disappeared. Compound C was swelled and extruded as described above to result in an expanded foam body containing coarse cells therein which were not applicable to practical use also from the stand point of appearance.

EXAMPLE 3

1 part by weight of azodicarbonamide was formulated with high density polyethylene (density 0.95 g/cm$^3$:MI 0.3) and pelletized at a temperature of 200° C. to form pellets having a foaming ratio of 1.3.

The pellets are immersed in Freon 11 and subjected to two heat cycles of 60° C. and 23° C. to prepare a foaming compound having a degree of swelling of 18% by weight. The time required for saturating the swelling was 50 hours.

The foaming compound was extruded to form an expanded foam body (D) having a foaming ratio of 15.

CONTROL EXAMPLE

The high density polyethylene used in Example 1 (not foamed) was immersed in Freon 11 under similar conditions as used in the above examples. The swelled product thus obtained had a degree of swelling of only 14% by weight.

The foaming compound was extruded using the same conditions as described in the above examples and the foaming ratio of the resulting foam body (E) was proved to be only 8. This ratio was about half that obtained with the foam body of the above examples.

A foaming compound (D) prepared according to the Example 3 and a foaming compound (E) prepared in the same way as the Control Example were left in air at room temperature (about 20°–30° C.), and the time required for a reduction in the degree of swelling to 10% was measured. The foaming compound (D) required 6 hours and the foaming compound (E) required about 3 hours.

EXAMPLE 4

The degree of swelling of polyolefins by the volatile liquid was measured. Each polyolefin was immersed in Freon 11 and Freon 113 and the saturated degree of swelling (increase in weight ratio) was measured. The results obtained are set forth below.

| Polyolefin | MP* (°C.) | Density (g/cm$^3$) | MI** | Degree of Swelling (wt. %) Freon 11 | Degree of Swelling (wt. %) Freon 113 |
|---|---|---|---|---|---|
| Polypropylene | 168 | 0.90 | 1.0 at 230° C. | 46.0 | 36.0 |
| Polyethylene | 111 | 0.92 | 1.0 | 23.0 | 11.0 |
| Polyethylene | 126 | 0.95 | 0.3 | 12.5 | 3.5 |
| Polyethylene | 138 | 0.95 | less than 0.01 | 12.0 | 2.5 |

*Melting Point
**Melt Index

EXAMPLE 5

The saturated degree of swelling was measured in the same way as described in Example 4 excep that the swelling was effected in Freon vapor. The results obtained are set forth below.

| Polyolefin | MP (°C.) | Density (g/cm$^3$) | MI (wt %) | Degree of Swelling Freon 11 | Degree of Swelling Freon 113 |
|---|---|---|---|---|---|
| Polypropylene | 168 | 0.90 | (1.0 at 230° C.) | 36.5 | 28.0 |
| Polyethylene | 111 | 0.92 | 1.0 | 22.5 | 11.5 |
| Polyethylene | 126 | 0.95 | 0.3 | 13.0 | 3.5 |
| Polyethylene | 138 | 0.95 | less than 0.01 | 12.5 | 3.0 |

EXAMPLE 6

A low density polyethylene having density of 0.92 g/cm$^3$ and a MI of 1.0 was swelled with Freon 113 at 20° C. to a degree of swelling of 10% by weight and then extruded using the apparatus as shown in FIG. 3 with the pressure in the storage (drying) tank and the hopper at 8 Kg/cm$^2$ and at a temperature of 100° C. to obtain a uniformly expanded foam body having a foaming ratio of 5.

When the foaming compound formed by similarly swelling these pellets was supplied to the conventional open type extruder and extruded at a temperature of 100° C., the resulted expanded foam had a foaming ratio of only 3.

EXAMPLES 7 and 8

| | Example 7 Pellet Density: 0.92 g/cm$^3$ MI: 1.0 | Example 7 Volatile Liquid Freon 11 | Example 8 Pellet Density 0.95 g/cm$^3$ MI: 0.3 | Example 8 Volatile Liquid Freon 113 |
|---|---|---|---|---|
| Degree of Swelling | 22%w at 20° C. | | 5%w at 20° C. | |
| Pressure in Storage (drying) Tank & Hopper | 10 Kg/cm$^2$ | | 10 Kg/cm$^2$ | |
| Extrusion Temperature | 100° C. | | 130° C. | |
| Foaming Ratio of the Expanded Foams Obtained | 21 (15*) | | 20 (15*) | |

*Foaming ratio obtained with expanded foams in aconventional open type hopper

EXAMPLE 9

In this example, the relationship between the temperature conditions used in the extrusion and the foaming ratio was examined for the foaming polyethylene used in Example 2.

The extruder used was of a full fright type, 50 mm in size and provided with a screw having a compression ratio of 1:3. The extrusion temperature was linearly varied in the four divided zones in the extruder. The temperature of the cross-head die was set constant after $C_4$. The results are set forth below.

| Temperature (°C.) | | | | Foaming Ratio (x) |
|---|---|---|---|---|
| $C_1$ | $C_2$ | $C_3$ | $C_4$ | |
| 200 | 180 | 160 | 140 | 10.5 |
| 170 | 160 | 150 | 140 | 8.5 |
| 140 | 140 | 140 | 140 | 7.0 |
| 110 | 120 | 130 | 140 | 6.0 |
| 95 | 110 | 125 | 140 | 5.0 |

EXAMPLE 10

The foaming polyethylene used in Example 1 was extruded for coating in the apparatus shown in FIG. 6 at a resin temperature of 130° C. and with a reduced pressure of 5 mmHg without cooling the adapter and applied onto an inner conductor heated at 120° C. An insulated wire was obtained having the cross section as shown in FIG. 7(b). The foaming ratio of the expanded foam was 10.5.

EXAMPLE 11

Figure 7C:
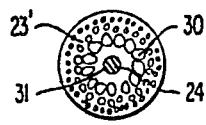
Figure 7D:
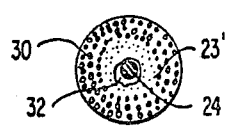

The foaming compound used in Example 10 was extruded for coating onto an inner conductor heated at 250° C. at the same resin temperature and a degree of pressure reduction as in Example 10, and without a cooling adapter. An insulated wire was obtained having the cross section as shown in FIG. 7(c). The foaming ratio was 9.0.

CONTROL EXAMPLE

Figure 7E:
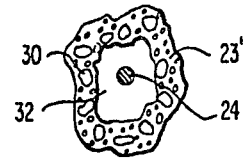

The foaming compound used in Example 10 was extruded for coating at a resin temperature of 130° C. without effect a pressure reduction, a cooling of the adapter and a heating of the inner conductor. An insulated wire having the cross section as shown in FIG. 7(e) was obtained. The foaming ratio was 9.5.

EXAMPLE 12

The foaming compound used comprised a mixture of low density polyethylene (density:0.92 g/cm$^3$, MI:1.0), Freon 11 as a foaming agent, and p,p"-oxybisbenzenesulfonylhydrazide as a nucleating agent in a ratio of 100:10:1 by weight, respectively.

The extruder shown in FIG. 9 was used provided with a die of a diameter of 12.5 mm, a parallel land of a length of 125 mm, a nipple with tapered angle of 30° and a fluorine resin insulation material, and cooling was effected only with the die portion using water at 20° C. The foaming compound was extruded for coating onto an inner conductor of copper wire having a diameter of 25 mm and supplied from the nipple at the rate of 5 m/min. The pressure was adjusted using a vacuum pump to about 4 mmHg.

The product obtained had the cross section as shown in FIG. 10, which has a solid layer on the outer surface thereof and the same outer diameter size of 12.0 mm as the die diameter. The foaming ratio was 6.

In the comparison runs in which a vacuum method or a water cooling of the die was not effected, the expanded foams can not be applied to the inner conductor at all.

The preferred adhesion between the expanded foams and the inner conductor can be achieved in the manner as shown in FIG. 8. Particularly, the best result was obtained with die portion 41 which is radially extended at the contacting die 35 side approximately corresponding to the expanding configuration of the expanded foams.

EXAMPLE 13

The polyethylene used in Example 2 was extruded for coating onto an inner conductor of 4.4 mm a diameter of using a 50 mm extruder while varying the die diameter and the ratio of the extrusion rate (calculated value per extrusion rate of the inner conductor) as shown in the table below to produce an expanded foam insulation layer of an outer diameter of 17 mm having a foaming ratio of about 7. A sizing die (molding die) was used to smoothen the surface of the expanded foams.

A coaxial cable was prepared by applying, on the expanded foam layer, an aluminum outer conductor with an inner diameter of 17 mm. Specimens were cut in a length of 50 cm from the coaxial cable and repeatedly sujected to heat cycling for ten times each comprising cooling for 1 hour at −20° C. and 1 hour heating at +60° C. to measure the longitudinal shrink in the expanded foams. The results are set forth together with the relation between the ratio of the extrusion rate and the length of shrink in the expanded foams in the table below:

| Die Diameter (mm) | Length of Shrink (mm) | Ratio of the Extrusion Rate between the Inner Conductor and the Foaming Polyethylene |
| --- | --- | --- |
| 5.5 | 1 | 1:3.5 |
| 6.0 | 4 | 1:2.2 |
| 7.8 | 16 | 1:1.0 |
| 9.0 | 21 | 1:0.6 |

EXAMPLE 14

Particulate low density polyethylene (density : 0.92 g/cm$^3$; 2.0) was supplied to a squeeze die (inlet diameter: 20 mm, exit diameter: 4.8 mm, and 30 mm in length) heated to 200° C. in the apparatus shown in FIG. 12 and rendered flowable by heat, and an inner conductor (4.4 mm$\phi$ copper) preheated to 100° C. was introduced therein at the rate of 5 m/min. Onto the inner conductor thus insulated with this film in a thickness of about 0.15 mm, foaming polyethylene with foaming ratio of 6.5 is extruded for coating in a thickness of 6.2 mm and an aluminum outer conductor is further applied thereon for coating and subjected to sinking thus to result in a highly expanded foam insulated coaxial cable having an outer conductor of an inner diameter of 17.0 mm.

The coaxial cable is suited for practical applications having the following characteristics

| Characteristic Impedance | 75.0 ohms at 10 MHz |
| --- | --- |
| Attenuation | 25 db/Km at 250 MHz |
| S R L | 1.1 at 10–300 MHz |

The measurement of the strength required to pull out and separate the inner conductor and the highly expanded foam is impossible because the expanded foams are collapsed at the time of measuring due to the strong adhesion present between them.

The heat shrinkage of the coaxial cable insulator is scarecely observed, when tested, at temperatures below the melting point of polyethylene.

The capacitance varies from 12 pF to 20 pF or more per 0.25 m when cooled through a water cooling Trough at the time of extruding foaming polyethylene, but the capacitance variation is eliminated by omitting the water cooling.

When a conventional caterpillar capstan is used for the take-up capstan, deformation occurs in the outer diameter of the expanded foams in more than ±1 mm. This deformation can be reduced to less than ±0.5 mm by applying polyurethane foam lining on the caterpillar capstan.

EXAMPLE 15

A copper wire of a diameter of 4.4 mm as an inner conductor was coated with foaming polyethylene having a foaming ratio of 7 to produce a highly expanded foam insulated wire of a diameter of 17.5 mm. Then, a 20% solution of rubber solution type SEIKA Olefin MA-E 30 (Trade name: available from Seitetsu Kagaku Kogyo Co. Ltd.) in toluene was continuously applied as an adhesive on the inner surface of an aluminum sheet tape of a thickness of 0.9 mm when the insulated wire was coated with the aluminum as an outer conductor while being shaped into a circular body through a forming die having a diameter of about 20.0 mm. Then, the butted portion of the aluminum tape was longitudinally are welded and sinking was effected using a sinking die of a diameter of 18.8 mm at a temperature of about 150° C. and with a feeding velocity of about 10 m/min. to produce a coaxial cable having an outer conductor of an outer diameter of 17.0 mm.

EXAMPLE 16

The same outer conductor as used in Example 15 was applied in the same way onto the same highly expanded foam insulated wire as in described in Example 15 while longitudinally providing on both sides a cohesive tape NP 111 (rubber type adhesive trade name: available from Sony Chemical Co. Ltd.) as a tape type of adhesive along the aluminum tape and then performing welding and sinking as described in Example 15 to produce a coaxial cable having an outer conductor of a diameter of 17.0 mm.

EXAMPLE 17

The same outer conductor as described in Example 15 was applied in the same way onto the same highly expanded foam insulated wire as described in Example 15 while continuously applying an epoxy series Bond-quick set (rubber type adhesive trade name: available form Konishigisuke Co.) as a two-component type adhesive on the inner surface of the aluminum tape. Then, the welding and sinking were effected as described in Example 15 to produce a coaxial cable having an outer conductor of a diameter of 17.0 mm.

EXAMPLE 18

The same outer conductor as described in Example 15 was applied in the same way onto the same highly expanded foam insulated wire as described in Example 15 while longitudinally providing a copolymer resin Bond-fast tape (rubber type adhesive trade name: Sumitomo Chemical Co., Ltd.) as a heat fusing type adhesive along the aluminum tape. The welding and sinking were performed in the same way as described in Example 15 to produce a coaxial cable having an outer conductor of a diameter of 17.0 mm.

REFERENCE EXAMPLE

The strength required to pull the inner conductor from the highly expanded foam of the coaxial cables in Examples 15 to 18 were tested using a tensile tester in the manner as shown in FIG. 15, and the adhesion strength between the highly expanded foam insulation layer and the outer conductor was measured using this pull-out strength. In FIG. 15, an inner conductor 54, an insulation layer 55 of expanded polyethylene, an outer conductor (aluminum) 56, a butt strap 61 having an aperture a little larger than the outer diameter of the insulation layer and a chuck 62 for uniformly clamping the entire periphery of the insulation layer. The arrow indicates the direction of the pull-out. The length of a sample was 50 cm and the pull-out velocity was 100 mm/min. The test results obtained are set forth in the table below compared with the data obtained from a cable in which an adhesive layer was not provided between the highly expanded foam insulation layer and the outer conductor.

| Sample | Pull-out Strength |
| --- | --- |
| Control Sample (without adhesive layer) | 20 Kg |
| Example 15 | more than 30 Kg (expanded polyethylene insulation layer ruptured) |
| Example 16 | more than 30 Kg (expanded polyethylene insulation layer ruptured) |
| Example 17 | more than 30 Kg (expanded polyethylene insulation layer ruptured) |
| Example 18 | more than 30 Kg (expanded polyethylene insulation layer ruptured) |

When welding and sinking the outer conductor of the samples of Example 15–18 and the Comparison Example, the outer surfaces of the outer conductors are water cooled in order to avoid deformation in the expanded foams.

While the invention has been described in detail and with reference to specific embodiments thereof, it will be apparent to one skilled in the art that various changes and modifications can be made therein without departing from the spirit and scope thereof.

What is claimed is:

1. In a process for producing a highly expanded polyolefin insulated coaxial cable having excellent high frequency characteristics comprising the steps of feeding a polyolefin, a nucleating agent and a volatile liquid blowing agent to an extruder and heat extruding said mixture through said extruder onto an inner conductor passing through said extruder to cover the outer periphery of said inner conductor thereby forming an insulation layer of a highly expanded polyolefin foam having a foaming ratio in excess of 2.5 times (60% expansion degree), the improvement which includes the step of, after extruding the foaming polyolefin mixture around said inner conductor, sizing the outer surface of said foaming polyolefin layer on said inner conductor by means of a sizing die having a parallel land at normal atmospheric pressure to prevent free foaming in the sizing die and to obtain the highly expanded uniform polyolefin insulation layer while providing tight adhesion of said insulation layer to said inner conductor due to the absence of a space between said foaming material and said inner conductor, which space, if present, would permit free expansion on said foaming material and wherein the temperature of the sizing die is maintained lower than the boiling point of the volatile liquid, said volatile liquid blowing agent being in liquid form and providing a lubricating effect for the foamed material being sized.

2. The process for producing a highly expanded polyolefin insulated cable as defined in claim 1, wherein said polyolefin is selected from the group consisting of low density polyethylene, medium density polyethylene, high density polyethylene, polypropylene and mixtures thereof.

3. The process as claimed in claim 1, wherein said nucleating agent comprises a solid blowing agent and a decomposition accelerator for said blowing agent and wherein said process includes compounding each of said blowing agent and said decomposition accelerator individually with a portion of said polyolefin.

4. The process as claimed in claim 1, wherein said volatile liquid is fed into said extruder as in a conventional injection process.

5. The process as claimed in claim 1, wherein said volatile liquid is fed into said polyolefin as in a conventional swelling process, the mixture then being fed into said extruder.

6. The process as claimed in claim 1, wherein the flow rate of said polyolefin mixture from a die at the head of said extruder is greater than the feeding rate of said inner conductor.

7. The process of claim 1, wherein said inner conductor is unheated.

8. The process of claim 1, wherein said foaming polyolefin mixture is applied directly to said inner conductor.

9. The process of claim 1, wherein the temperature of the extruder used for the extruding is maintained at a temperature higher than that of the sizing die.

10. The process as claimed in claim 1, wherein said sizing die has the same diameter as the extruded outer surface of the foaming polyolefin layer.

11. The process as claimed in claim 10, wherein said polyolefin mixture is substantially completely foamed during said extrusion.

12. The process as claimed in claim 1, wherein said polyolefin is a mixture of a low density polyethylene and a high density polyethylene.

13. The process as claimed in claim 12, wherein said mixture comprises about 80 to 20% high density polyethylene, balance low density polyethylene, based on the polyethylene present.

14. The process as claimed in claim 13, wherein said low density polyethylene has a density of less than 0.925 g/cm$^3$ and said high density polyethylene has a density of greater than 0.94 g/cm$^3$.

15. The process as claimed in claim 1, wherein said extruding is into said sizing die without any unconfined expansion of the extruded polyolefin mixture.

16. The process as claimed in claim 1, wherein the compression strength of the coaxial cable is increased due to radial shrinkage being prevented by said sizing die.

17. In a process for producing a highly expanded polyolefin insulated coaxial cable comprising the steps of feeding a polyolefin, a nucleating agent and a volatile liquid blowing agent to an extruder and heat extruding said mixture through said extruder onto an inner conductor passing through said extruder to cover the outer periphery of said inner conductor, thereby forming an insulation layer of a highly expanded polyolefin foam having a foaming ratio in excess of 2.5 times (60% expansion degree), the improvement which includes the step of applying a pressure reduction around said inner conductor up to an area near the contacting point of said foaming polyolefin mixture and said inner conductor but prior to said contacting point, and after extruding the foaming polyolefin mixture around said inner conductor, sizing the outer surface of said foaming polyolefin layer on said inner conductor by means of a sizing die having a parallel land at normal atmospheric pressure to prevent free foaming in the sizing die to obtain a uniform size of the highly expanded uniform polyolefin insulation layer while providing tight adhesion of said insulation layer to said inner conductor.

18. The process of claim 17, wherein the inner conductor is heated to thereby tightly adhere the foaming polyolefin insulation layer thereto.

19. The process of claim 17, wherein said inner conductor is heated prior to said pressure reduction, and after said pressure reduction said inner conductor is passed through a zone cooled to a temperature below the foaming point of the polyolefin, nucleating agent and volatile liquid mixture.

20. The process of claim 19, wherein the foamed polyolefin mixture has a foaming ratio in excess of 3.

21. The process of claim 20, wherein said pressure reduction is a pressure reduction of about 5 mmHg to about 200 mmHg.

22. Highly expanded polyolefin insulated coaxial cable having excellent high frequency characteristics wherein the inner conductor coated with the layer of insulation is produced by a process comprising the steps of feeding a polyolefin, a nucleating agent and a volatile liquid blowing agent to an extruder and heat extruding said mixture through said extruder onto an inner conductor passing through said extruder to cover the outer periphery of said inner conductor, thereby forming an insulation layer of a highly expanded polyolefin foam having a foaming ratio in excess of 2.5 times (60% expansion degree), wherein the improvement includes the step of, after extruding the foaming polyolefin mixture around said inner conductor, sizing the outer surface of said foaming polyolefin layer on said inner conductor by means of a sizing die having a parallel land at normal atmospheric pressure to prevent free foaming in the sizing die to obtain a uniform size of the highly expanded uniform polyolefin insulation layer while providing tight adhesion of said insulation layer to said inner conductor.

* * * * *